United States Patent [19]

Kerr et al.

[11] 3,995,414
[45] Dec. 7, 1976

[54] REMOVABLE TRASH BAG ASSEMBLY FOR LAWN MOWERS

[76] Inventors: Frederic L. Kerr, 11613 Albany Drive; Carol A. Carrigan, 11617 Albany Drive, both of Merrionette Park, Ill. 60655

[22] Filed: Apr. 14, 1975

[21] Appl. No.: 567,697

[52] U.S. Cl. .................................. 56/202; 55/364
[51] Int. Cl.² ...................................... A01D 35/22
[58] Field of Search ............ 56/202, 320.2; 55/364, 55/367; 15/DIG. 8; 229/53, DIG. 3, DIG. 14

[56] References Cited

UNITED STATES PATENTS

| 3,230,696 | 1/1966 | Liljenberg | 56/202 |
|---|---|---|---|
| 3,574,272 | 4/1971 | Krewson | 56/202 |
| 3,606,747 | 9/1971 | Bauman | 56/202 |
| 3,874,152 | 4/1975 | Dahl | 56/202 |

*Primary Examiner*—J.N. Eskovitz
*Attorney, Agent, or Firm*—John J. Kowalik

[57] ABSTRACT

A removable trash bag assembly for lawn mowers, wherein the bag is made of plastic and is hung from a frame attached to the mower. The bag is provided with hanging loops for easy mounting and removal with respect to the frame; and the mounting is arranged to flex the bag in tension to open slits provided in the side of the bag at its mouth due to the increasing weight of the trash as the bag progressively gets filled to exhaust the air when the primary vents in the mid-portion of the plastic are blocked. These slits also function to prevent bursting of a closed filled bag when it is dropped by providing vents at the top of the bag for any entrapped air. These slits are also functional to pass the folded open end portion of the bag therethrough to close the bag.

9 Claims, 8 Drawing Figures

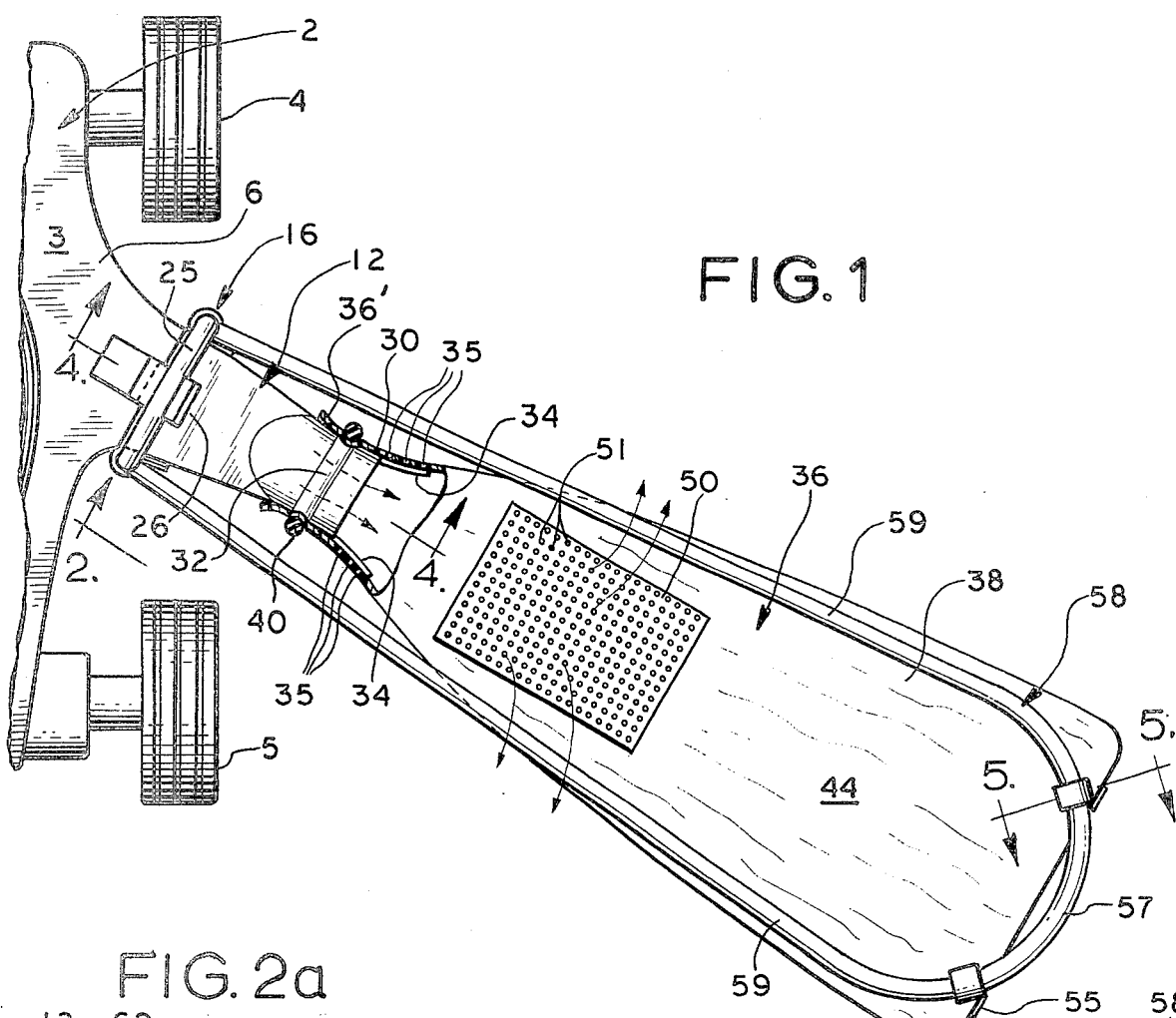
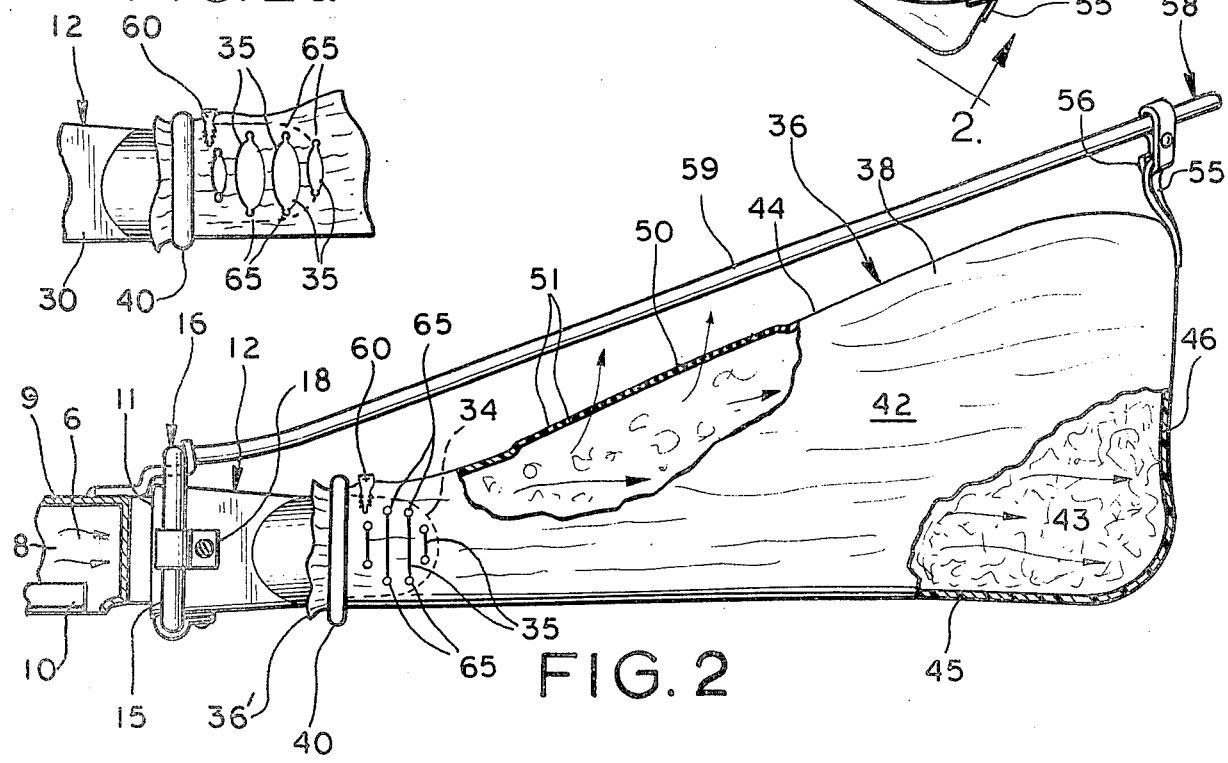

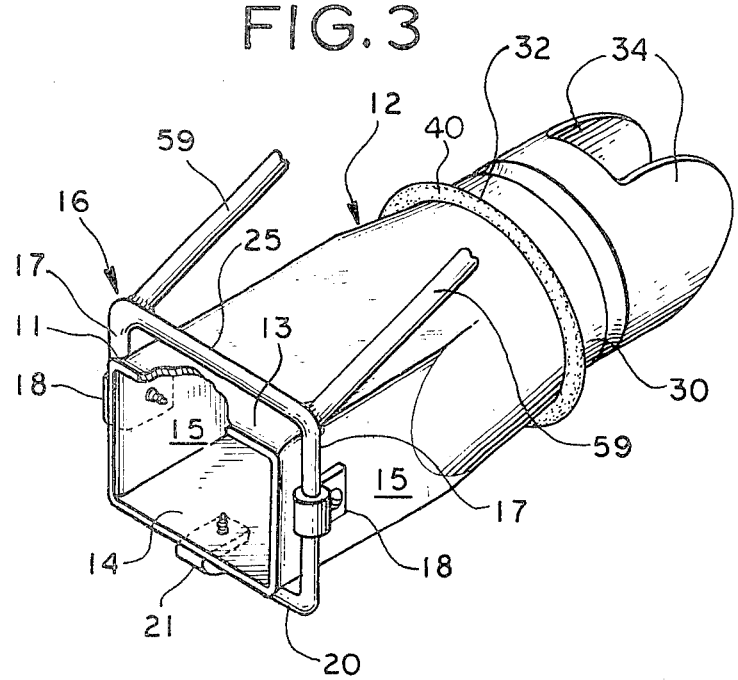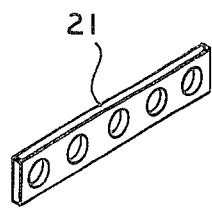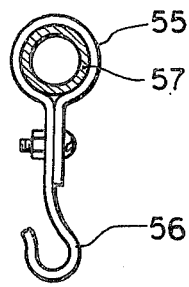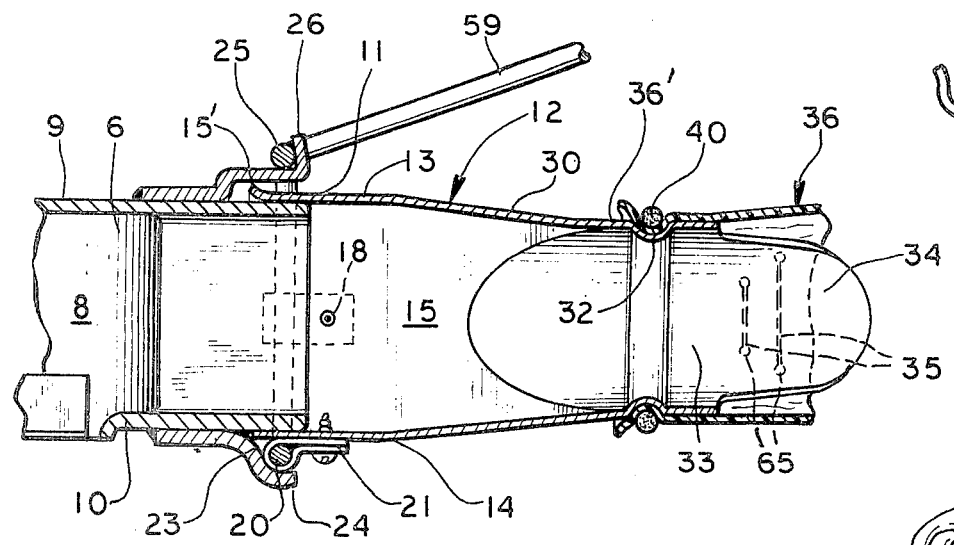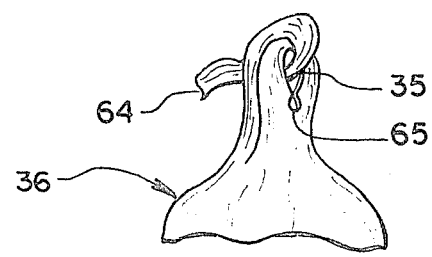

REMOVABLE TRASH BAG ASSEMBLY FOR LAWN MOWERS

DISCUSSION OF THE PRIOR ART

It has been difficult to provide a plastic removable bag for a mower because of the imperforate nature of the material. The bag would fill with air and the back pressure prevents entry of the grass or trash. Perforating the bag helps, except that after a short while the air-entrained particles clog the perforations frustrating further entry of material into the bag. Also, all mower bags of which applicants have knowledge require dumping of the mower bag into another receptable such as a plastic trash bag, which requires a double operation. Even such trash bags do not provide a facile closure and usually require a wire or twine to tie the open end closed.

SUMMARY OF THE INVENTION

This invention is directed to a novel and efficient mower bag mounting and bag structure in which the parts cooperate to facilitate mounting and removal of the bag, and wherein the bag is disposable with the grass or trash such as leaves by simply removing it from the mounting frame and discarding the bag after closing it.

The invention contemplates the provision of a novel bag structure and mounting wherein the bag is provided with slits at its mouth which are initially closed, but which as the bag is stretched by the weight of the trash deposited therein and becomes filled, the slots open up and provide extended vents for the air entraining the trash.

The invention further comprehends the provision of such auxilliary vent slots in a position such that the open end of the bag may be crimped and the crimped end passed through the slots to provide a securement closing the open end of the bag.

The invention also has for its object a novel bag mounting assembly which includes a horn or tubular transition over which the open end of bag is adapted to be sleeved and sphincterally held thereon by a sphincter band of elastic material such as a rubber ring, and wherein the transition is provided with a guide which serves as a baffle for guiding the material into the bag and which facilitates sleeving the bag onto the horn and which is positioned in shielding relation to the slits at the mouth of the bag to prevent impingement of the material flowing into the bag against this area of the bag and possibly clogging such slits or exhausting therethrough onto the ground.

These and other objects and advantages inherent in and encompassed by the invention will become more apparent from the specifications and the drawings, wherein:

FIG. 1 is a plan view partly broken away of the novel bag and frame assembly shown mounted on a mower fragmentarily illustrated;

FIG. 2 is a side elevational view of the structure shown in FIG. 1 partly broken away and in section, the view being taken essentially on line 2—2 of FIG. 1;

FIG. 2a is a fragmentary view of FIG. 2 showing the bag in tensioned position and the slits in the side of the bag elongated and forming vent openings.

FIG. 3 is a perspective view of the transition piece;

FIG. 3a is a perspective view of a mounting bracket of the frame;

FIG. 4 is an enlarged vertical sectional view of the structure through the transition piece taken substantially on line 4—4 of FIG. 1;

FIG. 5 is an enlarged cross-section taken substantially on line 5—5 of FIG. 1; and FIG. 6 is a side elevational view illustrating one manner of lacing the crimped closed end of the bag through the slots formed in the side of the bag to provide a closure.

DESCRIPTION OF THE INVENTION

The invention is disclosed in association with a rotary mower 2 of known construction which comprises a housing deck 3 carried on ground wheels 4 and 5 at each side and having a grass or trash outlet portion 6 through which air entrained material cut by the mower is discharged.

The outlet portion 6, as best seen in FIG. 4, is preferably a rectangular tubular structure having a vertical side wall 8 at each side and interconnecting top and bottom walls 9 and 10. The outlet tube 6 projects laterally outwardly from the mower deck and a complementary rectangular end 11 of a transition sleeve 12 is telescoped over the outer end of the outlet tube 6.

The inner end 11 of the transition sleeve or horn 12 has top and bottom walls 13 and 14 and side walls 15,15, all of which have an outwardly flared lip 15' to facilitate insertion over the outlet tube 6. A rectangular metal mounting frame 16 of round rod encircles the inner end portion 11 and has side braces 17,17 which are firmly secured by brackets 18,18 to the external sides of the portion 11. The lower brace 20 of the frame 16 is secured by bracket 21 against the bottom side of the bottom wall 14 and fits into a notch 23 (FIG. 4) which is provided by a hook 24 secured to the underside of the bottom wall 10 of the outlet tube. The upper bar 25 of the frame 16 hooks over a hook 26 which is attached to the top side of the top wall 9 of the outlet tube whilst the top wall 13 tucks into the slot 28 between the upwardly offset portion 29 of the hook 26 on the top wall 9 of the outlet tube. The transition piece has an outer end portion 30 formed as a cylinder and is provided with an annular groove 32 inwardly of its outer edge 33 (FIG. 4), and at each side is provided with spade-like extensions 34,34 which serve as baffles and as shields in covering relating to circumferentially elongated slits 35,35 formed in diametrically opposite sides of the mouth end portion 36' of a thin, flexible plastic bag 36 which may be made of polyethylene or like material.

The mouth end portion 36' is sleeved over the transition horn 12 until it covers the groove 32, and the rubber ring 40, which had been previously stretched and sleeved on the horn 12 and positioned inwardly of groove 32 is then rolled over the mouth end portion 36 of the bag until the ring sphincterally clamps the opposing portion of the port 36' of the bag into the groove, thus releasably securing the bag to the horn.

The bag body 38 is of generally triangular shape in side elevation and has side walls 42,43,44,45 and a bottom wall 46. The wall 45 which is at the bottom of the bag when suspended as seen in FIG. 2 is generally horizontal and wall 44 which is at the top slopes upwardly and outwardly whereby the bag is flared outwardly toward its bottom wall 46 in its collecting position on the mower.

The wall 44 is provided intermediate its ends with a perforated grid section 50 which serves to exhaust air which entrains the grass, leaves, etc. Upon the bag becoming full, the material eventually blocks off the vent openings 51 in the section 50 and the bag tends to expand by being blown up by the air. As this occurs, the side walls of the bag are stretched or put in tension and the slits 35,35 then open up as seen in FIG. 2*a* to form openings. The bag continues to fill either until the slits 35 are clogged or upon the operator deciding the bag is full enough and stops the machine. In the event the operator fails to stop the machine, the bag, which is hung from its bottom wall by two straps or eyes 55,55 which are looped over hooks 56,56 secured to the bight 57 of a metal U-shaped support frame 58, the legs 59,59 of which are welded to the frame 16, tends to swing outwardly and slide out from under the retainer ring 40 and an exit therefrom pops off the horn. This prevents the bag from exploding and scattering the contents.

After the bag is either manually or functionally removed from the transition piece it is unhooked from the support frame and up-ended and then is closed by a locking band 60 if one is provided by being tacked on by adhesive to the bag side, the band having a barbed tongue which is adapted to bind the neck end 62 of the bag and be threaded through the buckle 63.

If no locking band 60 is provided, the mouth of the bag is adapted to be crimped and the crimped end 64 is passed through one of the slots 35 on one side of the bag and passed out through an opposing slot 35 through one of the slots 35 on the other side of the bag. The slits terminate in arcuate margins 65 to reduce stress and to inhibit tearing.

It will be observed that a preferred form of the invention has been provided which is of simple and effective design, but is not intended to in any way limit the inventions which are covered in the appended claims.

I claim:

1. For use in a mower structure of the type having a trash outlet portion; a foraminous bag adapted to be suspended from said mower structure comprising a body portion having primary vent means and having a neck portion adapted to be positioned in communication with the outlet portion, normally closed auxiliary vent means on said neck portion operable to open and vent said bag upon said primary vent means being obstructed by material in the bag, and said mower outlet portion comprising baffle means disposed in shielding relation to said auxiliary vent means with respect to material entering said bag to prevent exit of material through said auxiliary vent means.

2. The invention according to claim 1 and said auxilliary vent means comprising slits elongated circumferentially of the bag.

3. The invention according to claim 2 and said mower structure comprising a frame extending laterally of the mower, and means swingably suspending the bag on the frame at an end remote from the mower to accommodate unrestricted expansion of the bag to open said auxilliary vent means.

4. The invention according to claim 3 and said mower having a horn forming an extension of said mower outlet portion and means releasably connecting the neck portion of the bag to the horn automatically releasable in response to air pressure increasing in said bag as the vent means become closed.

5. The invention according to claim 4 and said connection comprising said neck portion of the bag being sleeved over said horn, and a flexible ring embracing said neck portion and biasing said neck portion into a peripheral groove in the horn.

6. The invention according to claim 5 and means removably mounting the frame from the mower structure.

7. The invention according to claim 2 and said neck portion adapted to be crimped and passed through a slit on one side of the bag and through a slit on the opposing side of the bag to effect a closure of the bag.

8. The invention according to claim 2 and said slits terminating in stress reducing and rip-inhibiting generally arcuate margins.

9. For use with a mower structure of the type having a trash outlet portion; a foraminous bag adapted to be suspended from said mower structure comprising a body portion having primary vent means and having a neck portion adapted to be positioned in communication with the outlet portion, normally closed auxiliary vent means on said neck portion operable to open and vent said bag upon said primary vent means being obstructed by material in the bag, and said primary vent means being located in a side of said bag intermediate its ends and comprising minute aprertures formed in said bag, and said auxiliary vent means comprising openings in the bag openable only upon expansion of the bag, and immovable means blocking said auxiliary venting means from the air stream to prevent exit of material therethrough and guiding the material into the bag.

* * * * *